(12) United States Patent
Khan et al.

(10) Patent No.: US 8,565,145 B2
(45) Date of Patent: Oct. 22, 2013

(54) FAST ACCESS ASYNCHRONOUS REPEATER WAKEUP PROTOCOL

(75) Inventors: Shakeeb Z. Khan, Davie, FL (US); Joseph J. Medvid, III, Weston, FL (US); Charles R. Ruelke, Margate, FL (US); Richard S. Young, Weston, FL (US); Branko L. Avanic, Miami, FL (US); Lorenzo Cruger, Coral Springs, FL (US); Tan V. Dinh, Davie, FL (US); Mahes M. Ekanayake, Davie, FL (US); Armando J. Gonzalez, Miami, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 342 days.

(21) Appl. No.: 12/968,443

(22) Filed: Dec. 15, 2010

(65) Prior Publication Data

US 2012/0155566 A1    Jun. 21, 2012

(51) Int. Cl.
    *H04B 7/14* (2006.01)
(52) U.S. Cl.
    USPC ............................................. 370/315; 370/338
(58) Field of Classification Search
    USPC ................. 370/315, 316, 328, 338, 401
    See application file for complete search history.

(56) References Cited

U.S. PATENT DOCUMENTS

| | | | |
|---|---|---|---|
| 5,376,975 A * | 12/1994 | Romero et al. | 340/7.34 |
| 5,845,201 A | 12/1998 | Funke et al. | |
| 6,678,529 B1 * | 1/2004 | Moulsley et al. | 455/522 |
| 6,756,901 B2 * | 6/2004 | Campman | 340/573.1 |
| 7,145,885 B1 * | 12/2006 | Kimura et al. | 370/293 |
| 7,203,254 B2 | 4/2007 | Carsello et al. | |
| 7,593,947 B2 * | 9/2009 | Nagai et al. | 1/1 |
| 7,675,979 B1 * | 3/2010 | Yu et al. | 375/259 |
| 7,937,463 B2 * | 5/2011 | Chadli | 709/224 |
| 2007/0153734 A1 | 7/2007 | Lee et al. | |
| 2007/0291822 A1 | 12/2007 | Staley et al. | |
| 2010/0091697 A1 * | 4/2010 | Vucetic et al. | 370/315 |
| 2010/0136988 A1 | 6/2010 | Dewasurendra | |
| 2010/0159824 A1 | 6/2010 | Goodjohn | |
| 2010/0246477 A1 * | 9/2010 | Hasegawa | 370/315 |
| 2010/0296432 A1 * | 11/2010 | Mehta et al. | 370/315 |

FOREIGN PATENT DOCUMENTS

| | | |
|---|---|---|
| WO | 2004107694 A1 | 12/2004 |
| WO | 2008027750 A2 | 3/2008 |

OTHER PUBLICATIONS

PCT International Search Report Dated Aug. 1, 2012 for Counterpart Application.

* cited by examiner

*Primary Examiner* — Ricky Ngo
*Assistant Examiner* — Christine Ng
(74) *Attorney, Agent, or Firm* — Anthony P. Curtis; Daniel R. Bestor

(57) ABSTRACT

A method for transmitting a communication generated by an originating device to a target device using a repeating device is provided. In the method the communication is transmitted from the originating device and received at the repeating device. A repeater request sequence is transmitted from the originating device and retransmitted from the first repeating device to the target device before the repeater request sequence is received at the first repeating device.

12 Claims, 5 Drawing Sheets

FAST ACCESS ASYNCHRONOUS REPEATER WAKEUP PROTOCOL

FIELD OF THE INVENTION

The present invention relates generally to a fast access asynchronous repeater wakeup protocol in a communications system. In particular, the invention relates to a method to facilitate fast access to a diversity repeater using a frequency hopped, frequency division modulation (FDM) protocol.

BACKGROUND

Wireless communications devices, such as cellular phones, often use a cellular network to route communications from an originating device to a target device within a communications system. Some wireless communications devices are able to directly communicate with each other without the use of a cellular network. Often, this direct communication is used for short-range 'push-to-talk' type communications.

In some wireless devices, direct communication between a pair of wireless communications devices requires the use of a frequency hopping communications protocol, such as MotoTalk™ by Motorola, Inc. of Schaumburg, Ill. MotoTalk™ is deployed in a 900 MHz ISM band (Industrial, Scientific and Medical) and employs frequency hopping (FH) wireless channelization. The FH spectral distributions are governed by the Federal Communications Commission (FCC) and must meet distribution requirements that minimize interference uniformly across the ISM band.

Communications sent between an originating device and a target device within a communications system require a communications protocol, such as such as MotoTalk™. There are three phases to each communication, including a "Connection Establishment" (CE) phase in which the communication is established, followed by a "Traffic" phase in which audio/visual/textual data is sent, and a "Super Stop" phase in which the communication is terminated using a super stop burst.

With reference to FIG. 2, when sending a communication between an originating device 210 and a target device 230, a repeating device is used 220 that simply amplifies a received communication 202 and retransmits the communication 202, is used. The repeating device 220 allows for communications between an originating device 210 and a target device 230 that are too far apart for direct communication. Typically, more than one repeating device 220 may be used in a communications system 200.

In order to support the repeating device 220 within the communications protocol, the durations of synchronization bursts 251, traffic channel bursts 261, and PID bursts 281 are all increased to 30 ms, and the duration of acknowledgement (ACK) bursts 291 sent back from the target device 230 are reduced to 15 ms. The repeating device 220 communicates with the originating device 210 on uplink frequencies and with the target device 230 on downlink frequencies. Additionally, if the communication system 200 has multiple repeaters 220, a repeater available sequence 300 is included in the CE phase 240 of the communication 202 in order to determine which repeater 220 is available for use to retransmit communication 202. Furthermore, a repeater request sequence 310 having a series of repeater request bursts 311 (i.e. RREQ1 312, RREQ2 314, and RREQ3 316) is added to the CE phase 240 to let the originating device 210 indicate to any available repeating device 220, which repeating device 220, if any, the communication 202 should proceed through. A series of repeater acknowledgement (RACK) bursts 331 may be sent by the repeating device 220 to the originating device 210 to acknowledge receipt of the repeater request sequence 310.

As a result, this leads to a total time of as much as 1435 mS or more to establish communication between the originating device 210 and the target device 230. Moreover, the repeating device 220 does not begin transmitting the communication 202 received from the originating device 210 to the target device 230 until an acknowledgement (ACK) burst 291 is transmitted to the originating device 210 from the repeating device 220, which is approximately 675 ms after the originating device 210 begins transmitting the communication 202 resulting in some delay between the time the communication 202 is transmitted by the originating device 210 and received by the target device 230. The acknowledgement burst 291 confirms that the target device 230 is within range of the repeating device 220 and that the target device 230 is ready to receive the transmission. The transmission of the acknowledgement burst 291 from the repeating device 220 to the originator 210 indicates that the repeating device 220 and the target device 230 are within range and available.

These transmissions and acknowledgments may substantially increase the amount of time between when the communication device is activated and when communication actually starts. As a result, it would be desirable to reduce the delay between the time the communication is transmitted by the originating device and received by the target device within a communications system employing a frequency hopping protocol.

SUMMARY

In one aspect, a method for transmitting a communication generated by an originating device to a target device using a first repeating device is provided. The method includes transmitting the communication from the originating device and receiving the communication from the originating device at the first repeating device. The method also includes transmitting a repeater request sequence from the originating device and retransmitting the communication from the first repeating device to the target device before receiving at the first repeating device the repeater request sequence sent from the originating device.

In one aspect, a method for transmitting a communication generated by an originating device to a target device using a first repeating device is provided. The method includes transmitting an acknowledgement sequence from the target device and retransmitting the communication from the first repeating device to the target device before receiving at the first repeating device an acknowledgement sequence from the target device.

In one aspect, a method for transmitting a frequency hopping communication generated by an originating device to a target device using a first repeating device is provided. The method includes receiving the frequency hopping communication from the originating device at the first repeating device and retransmitting the communication from the first repeating device to the target device immediately after receiving the frequency hopping communication from the originating device.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

In the description that follows, the subject matter of the application will be described with reference to acts and symbolic representations of operations that are performed by one or more electronic devices, unless indicated otherwise. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

The present invention makes use of a method for transmitting a frequency hopping communication generated by an originating device to a target device using a first repeating device. The method receives the frequency hopping communication from the originating device at the first repeating device and then retransmits the communication from the first repeating device to the target device before receiving at the first repeating device a repeater request sequence sent from the originating device or an acknowledgement sequence from the target device. As a result, by retransmitting the communication from the first repeating device to the target device before receiving a repeater request sequence or an acknowledgement sequence, or immediately after transmitting a repeater selected sequence, the delay between the time the communication is transmitted by the originating device and received by the target device within a communications system employing a frequency hopping protocol is reduced.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

Figure 1:
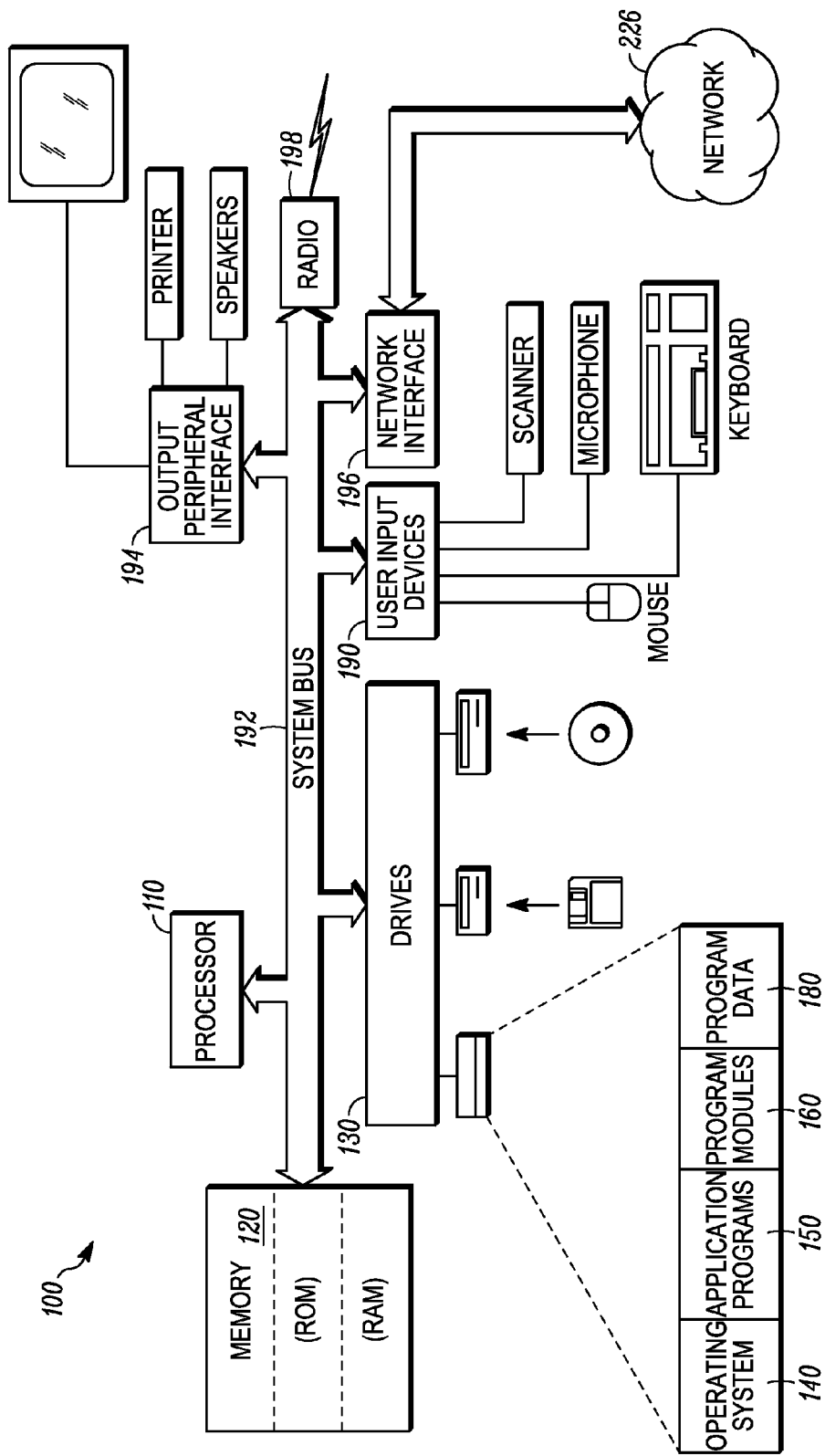
FIG. 1 depicts a block schematic diagram of an exemplary computing system, in accordance with one embodiment of the present invention.

With reference to FIG. 1, depicted is an exemplary computing system for implementing embodiments. FIG. 1 includes a computer 100, which could be any device which can be used to receive, store, and process information, including devices such as originating device 210, repeating device 220, or target device 230. Computer 100 may be a portable device, wherein at least some or all of its components are formed together in a single device which can be carried around by a person. The computer 100 includes a processor 110, memory 120 and one or more drives 130. The drives 130 and their associated computer readable memory medium provide storage of computer readable instructions, data structures, program modules and other data for the computer 100. Drives 130 can include an operating system 140, application programs 150, program modules 160, and program data 180. Computer 100 further includes input devices 190 through which data may enter the computer 100, either automatically or by a user who enters commands and data. Input devices 190 can include an electronic digitizer, a flatbed scanner, a barcode reader, a microphone, a camera, a video camera, a keyboard and a pointing device, commonly referred to as a mouse, a trackball or a touch pad, a pinpad, any USB device, any Bluetooth enabled device, an RFID or NFC device, and a debit card reader. Other input devices may include a joystick, game pad, satellite dish, scanner, and the like. In one or more embodiments, input devices 190 are portable devices that can direct display or instantiation of applications running on processor 110.

These and other input devices 190 can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers, printers, and/or display devices, which may be connected through an output peripheral interface 194 and the like.

Computer 100 also includes a radio 198 or other type of communications device for wirelessly transmitting and receiving data for the computer 100 with the aid of an antenna. Radio 198 may wirelessly transmit and receive data using WiMAX™, 802.11a/b/g/n, Bluetooth™, 2G, 2.5G, 3G, and 4G, wireless protocols.

Computer 100 may operate in a networked environment using logical connections to one or more remote computers, such as a target device 230. The target device 230 may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as radio 198, to environments such as the Internet. It will be appreciated that other means of establishing a communications link between computer 100 and other computers 100 may be used.

Figure 3:
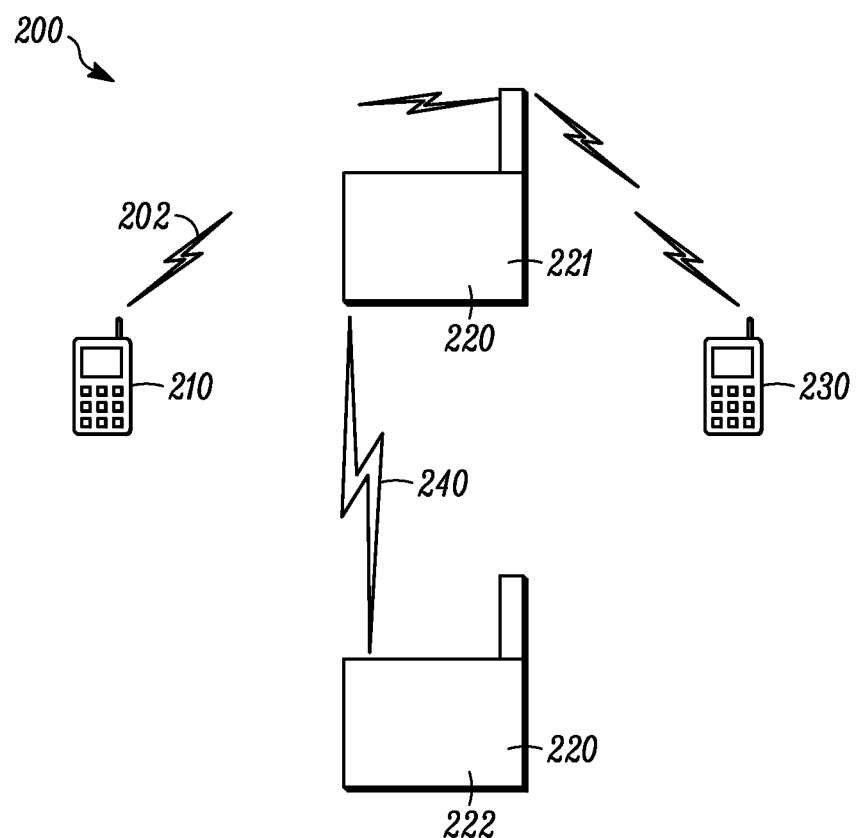
FIG. 3 depicts an illustration of a communications system transmitting communications between an originating device and a target device using a repeating device to retransmit the communications, in accordance with one embodiment of the present invention.

With reference to FIG. 3, depicted is a communications system 200 for transmitting a communication 202 generated by an originating device 210 to a target device 230 using a repeating device 220. Both the originating device 210 and the target device 230 are a wireless communications device, such as a cellular phone, a two-way radio, or a combination of both a cellular phone and a two-way radio. In one embodiment, originating device 210 and target device 230 may use a cellular network to route communications 202 from originating device 210 to target device 230 within communications system 200. In one embodiment, originating device 210 and target device 230 each use a two-way radio to directly communicate with each other without the use of a cellular network or infrastructure.

This direct communication is used for short-range push-to-talk (PTT) type communications. Push-to-talk (PTT), also known as Press-to-Transmit, is a method of conversing on half-duplex communication lines, including a two-way radio, using a momentary button to switch from reception mode for receiving a communication 202 to transmit mode for transmitting a communication 202. A typical PTT connection connects almost instantly and does not require the use of a communications network, such as a cellular network, since the two-way radios within the originating device 210 and the target device 230 are in such close proximity, they are capable of communicating directly with each other.

Preferably, the direct communication between originating device 210 and target device 230 requires the use of a frequency hopping communications protocol, such as Moto-Talk™ by Motorola, Inc. MotoTalk™ is deployed in a 900 MHz ISM band (Industrial, Scientific and Medical) and employs frequency hopping (FH) wireless channelization. A frequency hopping communications protocol is a method used for transmitting radio signals, such as communications 202, by rapidly switching a carrier among many frequency channels, using a pseudorandom sequence known to both the originating device 210 and the target device 230.

Figure 4:
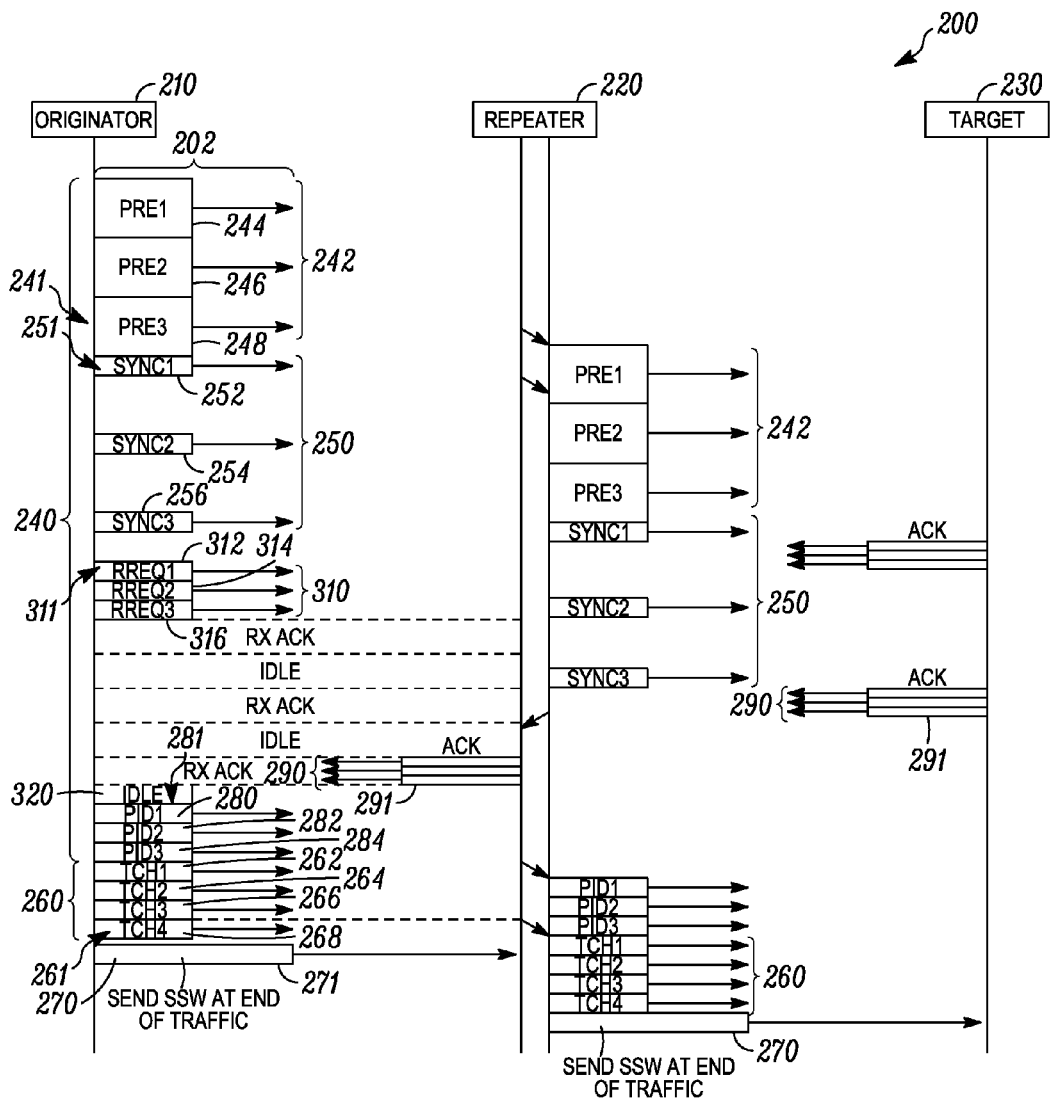
FIG. 4 depicts a schematic representation of a communications system transmitting communications between an originating device and a target device using a repeating device to retransmit the communications, in accordance with one embodiment of the present invention.

With reference to FIGS. 3 and 4, communications 202 sent from the originating device 210 to the target device 230 within a communications system 200 require using a communications protocol such as a frequency hopping communications protocol. There are three phases to each communication 202, including a "Connection Establishment" (CE) phase 240 followed by, a "Traffic" phase 260, and terminated by a "Super Stop" phase 270 using a super stop burst 271. Each of these three phases 240, 260, and 270 has an associated frame structure.

The CE phase 240 allows the target device 230 to acquire information about the communication 202 sent by the originating device 210, such as transmission frequency, bit synchronization, frame synchronization, frequency hopping seed, code identity, message content description, and to signal acknowledgment back to the originating device. The CE phase 240 includes the transmission of a preamble sequence 242 having a series of preamble bursts 241 (i.e. PRE1 244, PRE2 246, and PRE3 248) and a synchronization sequence 250 having a series of synchronization bursts 251 (i.e. SYNC1 252, SYNC2 254, and SYNC3 256) from the originating device 210 to the target device 230. The CE phase 240 is then completed by the originating device 210's transmission of the originating device 210's Private ID (PID) with a series of PID bursts 281 (i.e. PID1 280, PID2 282, and PID3 284) each using a Message Header Frame (MHF). The MHF is processed by a Message Header Procedure (MHP), which transfers data across a Mototalk channel after the ACK bursts 291 and before traffic channel bursts 281 are transmitted. The MHP conveys information about the upcoming traffic channel bursts 281. The PID, the frequency hopping seed, and the code identity are unique to each communication 202 and associated communications devices 210 and 230 participating in the communication 202 or call.

The Traffic phase 260 includes the transmission of traffic channel (TCH) bursts 261 (i.e. TCH1 262, TCH2 264, TCH3 266, and TCH4 268) including voice or data information. Communications 202 containing traffic channel bursts 261 are preferably carried on frequencies determined by pseudo-random (PN) sequences derived from a pseudo-random frequency hopping seed value, where the first non-Preamble and non-synchronization sequence typically picks up a sequence where a final burst of the originating device's previous transmission left off. The frequency hopping seed sent in the Sync Slot ID Block (i.e. SYNC1 252, SYNC2 254, SYNC3 256) indicates the position of a synchronization burst 251 within the synchronization sequence 250. The Sync Slot ID Block always precedes the beginning of each Traffic Channel (TCH) 260 hop iteration, or in other words, the traffic voice or data synchronized frequency hopping that occurs between the originating device 210 and the target device 230 (i.e. the FH sequence from start to finish of a communication or call) and identifies the particular slot positions in an ongoing communication. The pseudo-random frequency hopping seed that defines the FH sequencing is sent only once at the initial synchronization sequence in the CE phase 240.

With reference to FIG. 3, when sending a communication between the originating device 210 and the target device 230, a repeating device 220 is used if the distance between the originating device 210 and the target device 230 is too great for direct communication between the devices 210, 230. Repeating device 220 amplifies a communication 202 received from and generated by originating device 210 and then retransmits the communication 202 to the target device 230. The repeating device 220 allows for communications 202 to be transmitted between an originating device 210 and a target device 230 that are too far apart for direct communication but in which direct communications (not through the infrastructure) are desired. Preferably, communications system 200 includes a second repeating device 221 in addition to the first repeating device 220. Having multiple repeating devices 220, 221 allows the communications system 200 to have increased bandwidth or throughput. This is so that if the first repeating device 220 is busy relaying a call, then the second repeating device 221 is still available to handle other calls. For this purpose, the repeating devices 220, 221 are co-located, or are in near proximity to one another.

Figure 5:
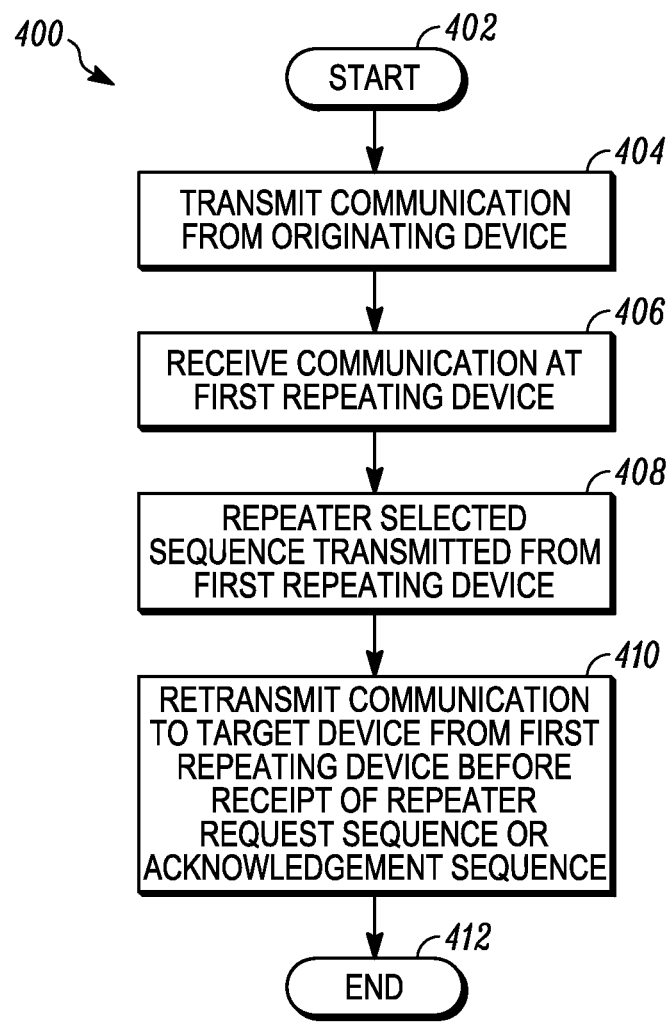
FIG. 5 depicts a flowchart illustration of methods, apparatus (systems) and computer program products, in accordance with one embodiment of the present invention.

With reference to FIG. 5, when using a repeating device 220, in order to reduce the amount of time required to receive a communication 202 generated by the originating device 210 at the target device 230, the communications system 200 employs a method 400 for transmitting a communication 202. Method 400 is initiated at block 402 by generating a communication 202 at the originating device 210. The communication 202 may be generated when a push-to-talk button is pressed on the originating device 210, and data or audio/visual information is then provided to the originating device 210. At block 404 the communication 202 is transmitted from the originating device 210 using a transmitter of the originating device 210. At block 406, communication 202 is received by the first repeating device 220.

With reference to FIGS. 3 and 5, upon receiving the communication 202, the first repeating device 220 transmits a repeater selected sequence 224 from the first repeating device 220 to second repeating device 221 at block 408. Preferably, communication 202 includes a unique code identity associated with the communication 202, and the repeater selected sequence 224 indicates that any communication 202 received by the second repeating device 221 having the same code identity is not to be retransmitted by the second repeating device 221.

At block 410, the first repeating device 220 retransmits the communication 202 to the target device 230. In one embodiment, the first repeating device 220 retransmits the communication 202 to the target device 230 before receiving at the first repeating device 220 a repeater request sequence 310 sent from the originating device 210. A repeater request sequence 310 is a request from the originating device 210 for a particular repeating device 220, such as first repeating device 220 or second repeating device 221, to handle the retransmission of communication 202 and is determined by originating device 210. Typically, since transmission of a repeater request sequence 310 requires the originating device 210 to receive and process information, such as signal strength, from repeating devices 221, 222, additional time is often required for communication 202 to be received at target device 230. By retransmitting the communication 202 to the target device 230 before receiving at the first repeating device 220 a repeater request sequence 310, communication 202 may be received sooner at target device 230.

Figure 2:
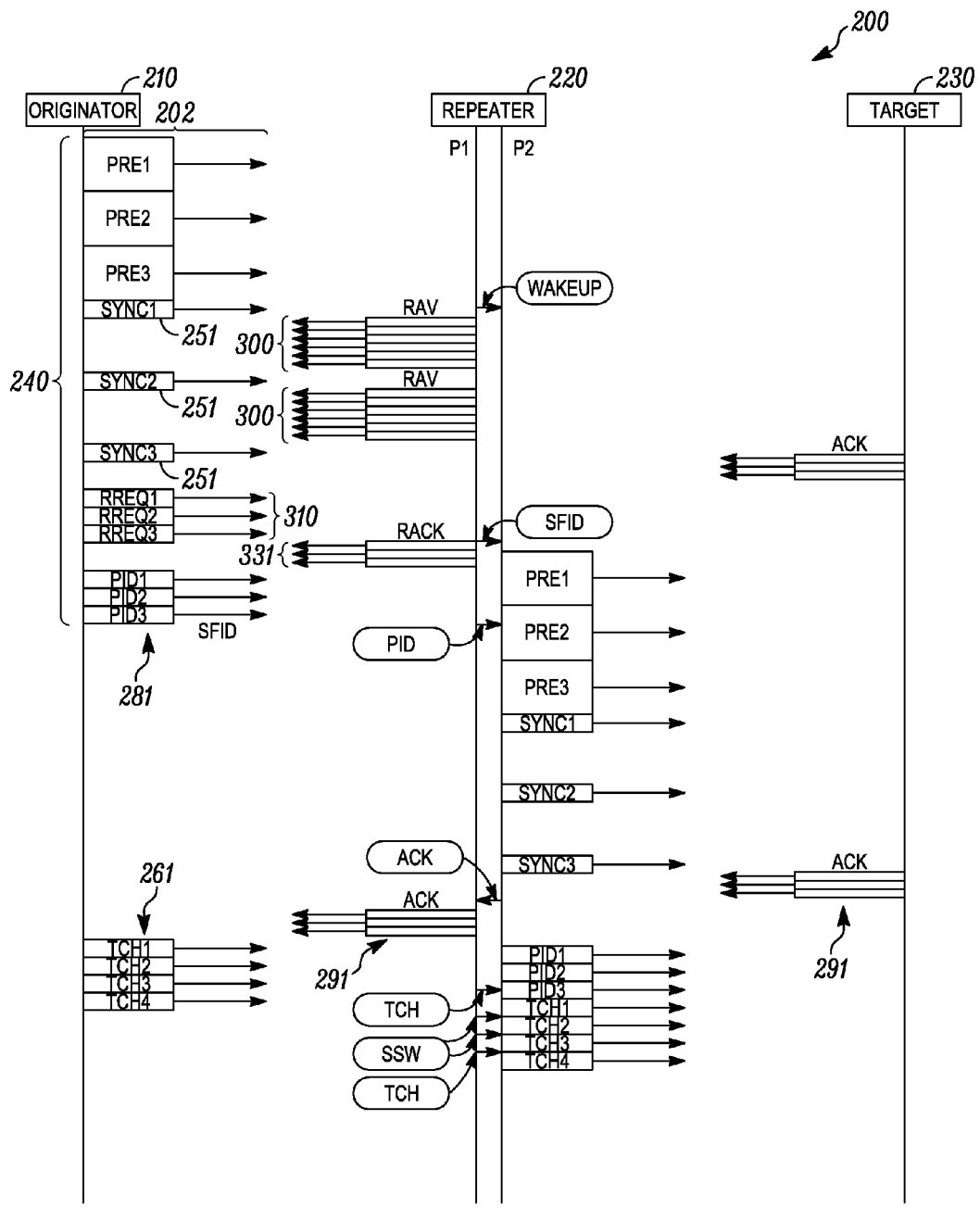
FIG. 2 depicts a schematic representation of a communications system transmitting communications between an originating device and a target device using a repeating device to retransmit the communications.

In one embodiment, the first repeating device 220 retransmits the communication 202 to the target device 230 before receiving at the first repeating device 220 or at the originating device 210 an acknowledgement sequence 290 from the target device 230. The acknowledgement sequence 290 confirms that the target device 230 230 is within range of the repeating device 220 and that the target device 230 is ready to receive the transmission. The transmission of the acknowledgement burst 291 from the repeating device 220 to the originating device 210 indicates that the repeating device 220 and the target device 230 are within range and available. Typically, the transmission of an acknowledgement sequence 290 from the repeating device 220 requires the transmission of a repeater acknowledgement sequence (RACK) 331, as shown in FIG. 2, at the repeating device 221, and is required before any communication 202 can be retransmitted. As a result, additional time is often required for communication 202 to be received at target device 230 if the transmission of a repeater acknowledgement sequence 331 at the first repeating device 220 is required, since the time it takes for the repeater acknowledgement sequence 331 to be transmitted adds to the total time of the communication 202. By retransmitting the communication 202 to the target device 230 without transmitting at the first repeating device 220 a repeater acknowledgement sequence 331, communication 202 may be received sooner at target device 230.

In one embodiment, the first repeating device 220 retransmits the preamble sequence 242, and particularly a preamble burst 241, before receiving at the first repeating device 220 a repeater request sequence 310 sent from the originating device 210.

In one embodiment, no repeater request sequence 310 is sent from the originating device 210 and the first repeating device 220 retransmits the communication 202 immediately after transmitting the repeater selected sequence 224.

Upon retransmitting the communication 202 to the target device 230, method 400 ends at block 412.

As a result, by retransmitting the communication 202 from the first repeating device 220 to the target device 230 before receiving a repeater request sequence 310 or a repeater acknowledgement sequence 331, or immediately after transmitting the repeater selected sequence 224, the delay between the time the communication 202 is transmitted by the originating device 210 and received by the target device 230 within the communications system 200 employing a frequency hopping protocol is reduced. Furthermore, by using the method herein, there is no need to wait for the repeater available sequence 300, which indicates that a repeating device 220 is available to retransmit a communication 202, to be transmitted from repeating device 220 to originating device 210. There is also no need for the originating device 210 to determine which repeating device 220, from the list of available repeating devices 220, to use and there is no need for the originating device 210 to then transmit the repeater request sequence 310, which indicates which repeating device 220 has been selected for use by the originating device 210 to retransmit the communication 202 to the target device 230.

Instead, by using the method herein, the first repeating device 220 to receive the communication 202, for example the first repeating device 220, begins retransmitting the communication 202 immediately upon receipt, without any communication or exchange of information between the repeating device 220 and the originating device 210. The first repeating device 220 to receive the communication 202 essentially selects itself to retransmit the communication 202, and then communicates to the other remaining repeating devices 220 in the area not to retransmit the communication 202 via the repeater selected sequence 224.

In one preferred embodiment, since the reception of the acknowledgement sequence 290 by the originating device 210 can occur at three possible locations, it is desirable for buffering of an audio signal within the communication 202 to be started by the originating device 210 as soon as an acknowledgement burst 291 is received by the originating device 210. Once received, an audio encoder within the originating device 210 uses approximately 120 ms to sample the audio and have it ready to be transmitted within a traffic channel burst 261. Therefore, in this embodiment, an idle slot 320 of approximately 30 ms is inserted after reception of the acknowledgement sequence 290 and before the first PID burst 280 is transmitted, as shown in FIG. 4. Also, a talk permit tone, which alerts an operator when to start talking into the microphone since the call establishment time varies, is setup such that its end corresponds to the beginning of the buffering of the audio signal.

Furthermore, since the repeating device 220 can now start retransmitting the communication 202 immediately after receiving the communication 202, and specifically immediately after receiving a portion of the preamble burst 241 or the preamble sequence 242 and before receiving a portion of the synchronization sequence 250, there needs to be padding involved to support a worst case scenario where the SYNC bursts 252, 254 are not received by the repeating device 220 and thus the first two SYNC bursts 252, 254 transmitted at the repeating device 220 as part of the SYNC sequence 250 are invalid. Therefore SYNC burst 256 has to be received at the repeating device 220 for the repeating device 220 to retransmit it to the target device 230. As a result, after the acknowledgement sequence 290 is transmitted on the target device 230 and in turn the repeating device 220 transmits its acknowledgement sequence 290, the repeating device 220 scans for a PID within a PID burst 281 after 90 ms, and the target device 230 scans for a PID within a PID burst 281 after 255 ms from transmitting its acknowledgement sequence

290. This 255 ms padding delay comes from 45 ms it takes for the acknowledgement sequence 290 to be transmitted from the repeating device 220 to the originating device 210, the 30 ms for idle slot 320, the 90 ms for the PID bursts 280, 282, 284 and the 90 ms worst case delay added to account for the longest possible delay from when the target device 230 transmits acknowledgement to when the repeating device 220 transmits acknowledgement.

In one embodiment, to support simultaneous multiple communications 202, the communications system 200 comprises a number of connected, co-located repeating devices 220. One of the repeating devices 220, designated as a master repeating device 220, employs the method of one of the above embodiments, while the rest of the repeating devices 220, designated as slave repeating devices 220, are in a sleep mode. When a communication 202 is detected by the master repeating device 220, the master repeating device 220 selects itself and retransmits the communication 202. Once the communication 202 is established through the master repeating device 220, one of the remaining slave repeating devices 220 is designated as a master repeating device 220, so that the slave repeating devices 220 is able to respond to an originating device's 210 request to use a repeating device 220, and begins to scan for transmissions of another communication 202. When a communication 202 terminates, the repeating device 220 which had been retransmitting the communication 202 becomes a slave repeating device 220 if another repeating device 220 is already designated as master repeating device 220.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A method for re-transmitting a communication generated by an originating device to a target device using a first repeating device, the method comprising:
receiving, by the first repeating device, a communication transmitted from the originating device, the communication comprising a connection establishment phase and a traffic phase, the connection establishment phase having a preamble sequence followed by a synchronization sequence followed by a repeater request sequence, the repeater request sequence being a sentence in which repeating services of a repeating device within range of the originating device are requested by the originating device; and
beginning retransmitting, by the first repeating device, the communication from the first repeating device to the target device before receiving the repeater request sequence at the first repeating device.

2. The method of claim 1, wherein the preamble sequence is retransmitted by the first repeating device before receiving the repeater request sequence at the first repeating device.

3. The method of claim 1, further comprising:
beginning retransmitting, by the first repeating device, the preamble sequence before receiving, at the first repeating device, the synchronization sequence sent from the originating device.

4. The method of claim 1, further comprising transmitting, by the first repeating device, a repeater selected sequence from the first repeating device to a second repeating device upon receiving the communication from the originating device at the first repeating device and prior to completely receiving the communication, the repeater selected sequence instructing the second repeating device to refrain from also repeating the communication.

5. The method of claim 4, wherein the communication establishment phase of the communication includes a unique code identity associated with the communication, and wherein the repeater selected sequence transmitted to the second repeating device includes the unique code identity and indicates that any communication received by the second repeating device having the same code identity is not to be retransmitted by the second repeating device.

6. The method of claim 1, further comprising receiving, at the first repeating device, an acknowledgement sequence from the target device indicating that the target device is prepared to receive the communication, and responsively transmitting a second acknowledgement sequence to the originating device indicating that the first repeating device is within range of the originating device and is available and that the target device is within range of the first repeater device and is available.

7. A first repeating device for repeating transmissions received from an originating device to one or more target devices, the device comprising:
a radio;
a memory; and
a processor configured to:
receive, via the radio, a communication transmitted from the originating device, the communication comprising a connection establishment phase and a traffic phase, the connection establishment phase having a preamble sequence followed by a synchronization sequence followed by a repeater request sequence, the repeater request sequence being a sequence in which repeating services of a repeating device within range of the originating device are requested by the originating device;
beginning to retransmit, via the radio, the communication from the first repeating device to the target device before receiving the repeater request sequence at the first repeating device.

8. The first repeating device of claim 7, wherein the preamble sequence is retransmitted by the first repeating device before receiving the repeater request sequence at the first repeating device.

9. The first repeating device of claim 7, wherein the processor is further configured to:
beginning to retransmit, via the radio, the preamble sequence before receiving, at the first repeating device, the synchronization sequence sent from the originating device.

10. The first repeating device of claim 7, wherein the process is further configured to:
transmit a repeater selected sequence to a second repeating device upon receiving the communication from the originating device at the first repeating device and prior to completely receiving the communication, the repeater selected sequence instructing the second repeating device to refrain from also repeating the communication.

11. The first repeating device of claim 10, wherein the communication establishment phase of the communication includes a unique code identity associated with the communication, and wherein the repeater selected sequence transmitted to the second repeating device includes the unique code identity and indicates that any communication received by the second repeating device having the same code identity is not to be retransmitted by the second repeating device.

12. The first repeating device of claim 7, wherein the processor is further configured to receive, via the radio, an acknowledgement sequence from the target device indicating that the target device is prepared to receive the communication, and to responsively transmit, via the radio, a second acknowledgment sequence to the originating device indicating that the first repeating device is within range of the originating device and is available and that the target device is within range of the first repeater device and is available.

* * * * *